(12) United States Patent
Atzel

(10) Patent No.: US 7,395,261 B1
(45) Date of Patent: Jul. 1, 2008

(54) SYSTEM AND METHOD FOR ORDERING ITEMS

(76) Inventor: Amy Hobbs Atzel, 708 N. 1st St., Minneapolis, MN (US) 55401-1133

( * ) Notice: Subject to any disclaimer, the term of this patent is extended or adjusted under 35 U.S.C. 154(b) by 0 days.

(21) Appl. No.: 09/717,529

(22) Filed: Nov. 21, 2000

(51) Int. Cl.
*G06F 17/30* (2006.01)

(52) U.S. Cl. .................. 707/5; 707/10; 707/104.1; 715/505

(58) Field of Classification Search ........... 707/1–6, 707/10, 100, 104.1, 102; 709/203; 705/26, 705/27; 715/500, 505, 513
See application file for complete search history.

(56) References Cited

U.S. PATENT DOCUMENTS

| | | | | |
|---|---|---|---|---|
| 5,361,204 A | | 11/1994 | McCollough et al. | 715/530 |
| 5,623,681 A | * | 4/1997 | Rivette et al. | 715/522 |
| 5,664,110 A | | 9/1997 | Green et al. | 705/26 |
| 5,710,887 A | | 1/1998 | Chelliah et al. | 705/26 |
| 5,745,681 A | | 4/1998 | Levine et al. | 709/200 |
| 5,790,793 A | | 8/1998 | Higley | 709/218 |
| 5,870,717 A | | 2/1999 | Wiecha | 705/26 |
| 5,873,076 A | * | 2/1999 | Barr et al. | 707/3 |
| 5,897,622 A | | 4/1999 | Blinn et al. | 705/26 |
| 5,933,546 A | | 8/1999 | Stone | 382/278 |
| 5,950,187 A | | 9/1999 | Tsuda | 707/3 |
| 5,960,411 A | | 9/1999 | Hartman et al. | 705/26 |
| 5,987,454 A | | 11/1999 | Hobbs | 707/4 |
| 5,991,739 A | | 11/1999 | Cupps et al. | 705/26 |
| 5,991,780 A | * | 11/1999 | Rivette et al. | 715/512 |
| 6,026,411 A | | 2/2000 | Delp | 707/104.1 |
| 6,038,561 A | * | 3/2000 | Snyder et al. | 707/6 |
| 6,064,979 A | | 5/2000 | Perkowski | 705/26 |
| 6,067,416 A | | 5/2000 | Fraser | 717/178 |
| 6,088,483 A | | 7/2000 | Nakano et al. | 382/209 |
| 6,101,482 A | | 8/2000 | DiAngelo et al. | 705/26 |
| 6,128,600 A | | 10/2000 | Imamura et al. | 705/27 |
| 6,154,738 A | | 11/2000 | Call | 707/4 |
| 6,169,986 B1 | | 1/2001 | Bowman et al. | 707/5 |
| 6,332,135 B1 | | 12/2001 | Conklin et al. | 705/80 |
| 6,363,361 B1 | * | 3/2002 | Lundberg | 705/40 |
| 6,401,118 B1 | * | 6/2002 | Thomas | 709/224 |
| 6,408,316 B1 | * | 6/2002 | Himmel et al. | 707/501.1 |
| 6,434,580 B1 | * | 8/2002 | Takano et al. | 715/530 |

(Continued)

FOREIGN PATENT DOCUMENTS

EP 0 957 438 A2 11/1999

(Continued)

OTHER PUBLICATIONS

David Hitchcock, "Patent Searching Made Easy, How to Do Patent Searches on the INternet & in the Library", Nolo, copyright 1999, published Jan. 2000, ISBN: 0873375548.*

(Continued)

*Primary Examiner*—Cheryl Lewis

(57) ABSTRACT

A system and method for retrieving items, the method includes the steps of receiving a text request comprising a unique identifier identifying an electronic file and unformatted text, parsing the text request to identify the unique identifier, and requesting the electronic file associated with the unique identifier. Where the request comprises more than one unique identifier, the unique identifiers are provided to a user for selection of one or more of the unique identifiers and the user is queried to order the file associated with the selected unique identifiers.

18 Claims, 11 Drawing Sheets

U.S. PATENT DOCUMENTS

| | | | | |
|---|---|---|---|---|
| 6,513,031 | B1* | 1/2003 | Fries et al. | 707/3 |
| 6,519,585 | B1* | 2/2003 | Kohli | 707/3 |
| 6,556,992 | B1* | 4/2003 | Barney et al. | 707/6 |
| 6,571,241 | B1* | 5/2003 | Nosohara | 707/6 |
| 6,591,261 | B1* | 7/2003 | Arthurs | 707/2 |

FOREIGN PATENT DOCUMENTS

| | | |
|---|---|---|
| JP | 5-181912 | 7/1993 |

OTHER PUBLICATIONS

David L. Trafton—Lockheed Martin, "How to Use Your PLUS Results: For Examiners", Nov. 23, 1999, pp. 1-6.*

"B1 —esp@cenet —your gateway to patents", http://gb.espacenet.com, 1 page (Jan. 19, 2001).

"Corporate Intelligence, patents and trademarks", http://www.1790.com, 2 pages (Jan. 17, 2001).

"Delphion Intellectual Property Network—Search patents of the world", http://www.delphion.com, 1 page (Jan. 17, 2001).

"Document Title", http://www.patentbank.com, 1 page (Jan. 17, 2001).

"Entrez-PubMed", http://www.ncbi.nlm.nih.gov/PubMed, 1 page (Jan. 17, 2001).

"Faxpat for patent histories, patent documents and trademark fiile histories", http://www.faxpatinc.com, 2 pages (Jan. 17, 2001).

GetThePatent.com—Complete USPTO,EPO, and WIPO (PCT) patent documents at the clic, http://www.getthepatnt.com, 2 pages (Jan. 17, 2001).

"Lycos Music: Downloads", http://music.lycos.com/downloads, 4 pages (Jan. 17, 2001).

"MP3.com: free mp3 downloads online cd jukebox MP3 music greeting cards", http://www.mp3.com/?lang=eng, 3 pages (Jan. 17, 2001).

"Napster", http;//www.napster.com, 1 page (Jan. 17, 2001).

"Patent document delivery, images, full text patent research, front-page patent research", http://www.micropat.com/0/patentweb9809.html, 1 page (Jan. 17, 2001).

"REEDFAX—the Patent Connection—Home Page", http://www.reedfax.com, 1 page (Jan. 17, 2001).

"US Patent and Trademark Office—Online Shopping Welcome", https://www3.uspto.gov/vision-service/ShoppingCart_P/ShowHomePage, 1 page (Jan. 17, 2001).

"USPAT.COM —The Patent Site for Inventors, Attorneys, Kids and Scholars for Intellectual", http://www.uspat.com/orderform.html, 2 pages (Jan. 17, 2001).

Lee, D. et al., "A Sample Statistical Characterization of the World-Wide Web," *Southeastcon '97. Engineering New Century. Proceedings. IEEE* Blacksburg, VA, pp. 174-178 (Apr. 12-14, 1997).

* cited by examiner

```
File Edit View Go Message Communicator Help                              - □ X Get Msg  New Msg  Reply  Reply All  Forward  File  Next  Print  Delete    USWest Subject: order these patents
Date: Sun 13 Aug 2000 18:26:09-0500
From: Amy Atzel <amy@gogopatent.com>
To: anyone@foo.com For immediate ordering: for our validity opinion we will need to obtain
the stevens patent (3,781,929) also get copies
of 3781928 and 3732,844, which came up in a
preliminary search. nancy would also like to have clean copies of
3782807, and 37,82801 to attach to her brief.

while you are at it, go ahead and get these too.
1 6,041,273 Emergency control aircraft system using thrust modulation
2 6,041,019 Fusing contact data for best-estimate solution
3 6,040,935 Flexureless multi-stable micromirrors for optical switching
3403 RE36,781 Differential comparator for amplifying small swing signals
to a full swing output
bob wants some reissues RE36,779 Molded surface fastener
3406 RE36,778 Coded health-care glove 3407 PP11,457 Spathiphyllum plant
named `Sparego`
3410 PP11,454 Anthurium plant named `Cynthia`  3411 PP11,453 Nandina
plant named `Colerno` the art department would like to see these patents: D428543, D428,542,
*thats all for now.*

Start   order these patents                                              6:27 PM
```

FIG. 4

```
┌─────────────────────────────────────────────────────────────┐
│ File Edit View Favorites Tools Help                  - □ X  │
├─────────────────────────────────────────────────────────────┤
│ Back Forward Stop Refresh Home Search Favorites History Print ▶ │
├─────────────────────────────────────────────────────────────┤
│ Address  http://www.gogopatent.com/gogo/requestbox.html     │
├─────────────────────────────────────────────────────────────┤
│                                                             │
│              gogopatent.com  Request Page                   │
│                                                             │
│   Paste Your Request in this Box:                           │
│  ┌──────────────────────────────────────┐ ▶                 │
│  │ Subject: order these patents         │    Convenience begins here! │
│  │ Date: Sun 13 Aug 2000 18:26:09-0500  │                   │
│  │ From: Amy Atzel <amy@gogopatent.com> │    Now there is an easier, faster, better way to │
│  │ To: anyone@foo.com                   │    order patent documents combined with rapid │
│  │                                      │    delivery to your desktop! │
│  │ For immediate ordering: for our validity │                │
│  │ opinion we will need to obtain       │    We can handle your largest orders! │
│  │ the stevens patent (3,781,929) also get copies │         │
│  │ of 3781928 and 3732,844, which came up in a │           │
│  │ preliminary search. nancy would also like to │          │
│  │ have clean copies of                 │                   │
│  │ 3782807, and 37,82801 to attach to her brief. │         │
│  │                                      │                   │
│  │ while you are at it, go ahead and get these │           │
│  │ too.                                 │                   │
│  │ 1 6,041,273 Emergency control aircraft system │         │
│  │ using thrust modulation              │                   │
│  │ 2 6,041,019 Fusing contact data for best- │             │
│  │ estimate solution                    │                   │
│  │ 3 6,040,935 Flexureless multi-stable │                   │
│  └──────────────────────────────────────┘                   │
│   [Submit]  [Reset]                                         │
│                                                             │
│                          home                               │
│                                                             │
├─────────────────────────────────────────────────────────────┤
│ Start  APACHE        gogopatent.com - Mic        6:30 PM    │
└─────────────────────────────────────────────────────────────┘
```

FIG. 6

File Edit View Favorites Tools Help

Back Forward Stop Refresh Home Search Favorites History Print

Address http://www.gogopatent.com/igor/allpat.pl

*gogopatent.com Order Page*

The following patent numbers were detected:

- ✓ 6041273
- ✓ 6041019
- ✓ 6040935
- ✓ 3732844
- ✓ 3782807
- ✓ 3782801
- ✓ 3781929
- ✓ 3781928
- ✓ D428542
- ✓ D428543
- ✓ PP11453
- ✓ PP11454
- ✓ PP11457
- ✓ RE36778
- ✓ RE36779
- ✓ RE36781

Total number of patents: 16
Un-check any patents you do not wish to order
To order all of the above patents, hit submit Submit cancel order and start over Start   perl   patents found - Microsoft I...   6:42 PM

FIG. 7

Thanks for ordering from gogopatent.com

Your patent order is ready for download or viewing:

6041273
6041019
6040935
3732844
3782807
3782801
3781929
3781928
D428542
D428543
PP11453
PP11454
PP11457
RE36778
RE36779
RE36781

Click Here for Bundled Download

Click Here to Place Another Order

FIG. 8

SYSTEM AND METHOD FOR ORDERING ITEMS

TECHNICAL FIELD

The present invention relates to methods and systems of effecting business on the Internet. More particularly, although not exclusively, the present invention relates to methods and systems for allowing a user to request and retrieve desired information on a computer system.

BACKGROUND OF THE INVENTION

The web has become an important vehicle for establishing and maintaining a business presence in the global economy. For example, retail stores, catalog companies, service industries, airlines, publishers, realtors, and others have increased business by establishing and maintaining web sites that display their products/services and allow users to view, select, and purchase the respective products/services. Electronic commerce (e-commerce) has become a viable and important way of conducting business.

Current state of the art methods for requesting and obtaining desired electronic information or selecting items for online purchase typically employ one of the following types of online methods. 1) Viewing an online catalog, selecting desired items, and by selecting desired items, putting them into an electronic shopping cart. These steps can be preceded by a request query and/or have query steps in between, as well as navigational browsing steps around the web site(s) of interest. This method works well for items that are identified primarily by pictures (such as clothing or groceries) or descriptions of item contents (such as books). This online method mimics a person's real life shopping routine: browse, select, purchase. 2) Entering of a formatted request (such as one item per line) to a web server. The items of such a request are typically obtained by an online search; wherein the output is generally presented to the user in a format containing descriptions, numbers, and useful information. While the search output format is user friendly in that it gives the user desired information, this same format, however, is not amenable to the ordering of items for purchase or download. Generally, the search output has to be adapted, reformatted, or visually parsed by the user before any items within can be ordered and purchased.

Document retrieval systems available online are typically coupled to a database search system. An example of such a system is the PubMed searchable database operated by the National Library of Medicine available at www.ncbi.nim.nih.gov/PubMed/. To locate journal articles on a certain topic, a user performs an author or keyword search of the PubMed database through a client browser. The result of the search is a list of journal titles and abstracts related to the search query. This list is presented to the user via the client browser. Depending upon the publisher of the journal article, there may be an option for the user to view the full text document by linking to it on the publisher's web page. In the PubMed system, the documents are stored in a distributed manner in each publisher's server. Additionally, many of the publishers require a separate login and/or subscription to their sites to retrieve journal articles. The nature of this architectural setup requires that each individual document be selected and downloaded. Hence, while documents can be "retrieved" over the Internet by initiating the process at a web site such as PubMed, the primary function of PubMed is to provide a searchable database.

Another document retrieval system is described in U.S. Pat. No. 5,873,076. This patent discloses a database containing records referencing both text and multimedia files that can be queried by a user. The patent discloses natural language input by the user, semantic interpretation of the query, and weighted relevance of hits. Furthermore, it discloses that files that are associated with the result list are retrieved from various plural sources. As a consequence, the '076 patent discloses user accounting and tracking to each source to facilitate proper royalty payments. Like the PubMed example, the '076 patent architecture and user interface require individual documents or multimedia files to be accessed individually by the user by employing, for example, mouse clicks.

SUMMARY OF THE INVENTION

In accordance with the present invention, the above and other problems are solved by a method and system for receiving a text request comprising a unique identifier identifying an electronic file and unformatted text, parsing the text request to identify the unique identifier, and requesting the electronic file associated with the unique identifier. Where the request comprises more than one unique identifier, the unique identifiers are provided to a user for selection of one or more of the unique identifiers and the user is queried to order the file associated with the selected unique identifiers.

The invention may be implemented as a computer method, a computing system or as an article of manufacture such as a computer program product or computer readable media. The computer program product may be a computer storage media readable by a computer system and encoding a computer program of instructions for executing a computer method. The computer program product may also be a propagated signal on a carrier readable by a computing system and encoding a computer program of instructions for executing a computer method.

In accordance with other aspects, the present invention relates to a system for retrieving items. The system includes a request module receiving unformatted data and a unique identifier identifying an item, a parser module identifying the unique identifier, and an order module that enables the server system to process an order for the item associated with the unique identifier.

In accordance with still other aspects, the present invention relates to a method of retrieving items. The method includes the steps of receiving a request comprising a unique identifier and data, wherein the unique identifier identifies an item, parsing the request to identify the unique identifier, and requesting the item associated with the unique identifier. The method may include the steps providing the unique identifiers to a user for selection of one or more of the unique identifiers; and querying a user to order the items associated with the selected unique identifiers.

A significant advantage of the invention is that it is time saving and allows greater accuracy than other ordering methods. The user does not spend valuable time visually parsing an online search and entering individually the desired items for purchase. Since the user is not required to enter the desired items manually and individually, errors are reduced and the time spent entering items is minimized.

The present invention can be used in addition to and in conjunction with traditional a commerce methods. However, the present invention can also be employed as an alternative to traditional e-commerce methods. The present invention is described in the context of the web. However, the invention may find application in any environment where stored items are accessible to one or more users. The invention can be applied to a multi-user Intranet or Internet environment, or even to a non-networked environment where stored items are accessed by a single user. One aspect of the invention includes parsing a user's request and delivering the desired request without numerous mouse clicks or keyboard strokes. The present invention is useful for enacting electronic commerce and electronic information and file retrieval.

These and various other features as well as advantages, which characterize the present invention, will be apparent from a reading of the following detailed description and a review of the associated drawings.

BRIEF DESCRIPTION OF THE DRAWINGS

FIG. 4 illustrates an exemplary screen display showing the text of an email message.

FIG. 6 is an exemplary screen display showing the text pasted into the input window shown in FIG. 5.

FIG. 7 is an exemplary screen display showing the identified items.

FIG. 8 is an exemplary screen display showing the files that may be viewed or downloaded.

DETAILED DESCRIPTION OF THE INVENTION

Figure 1:
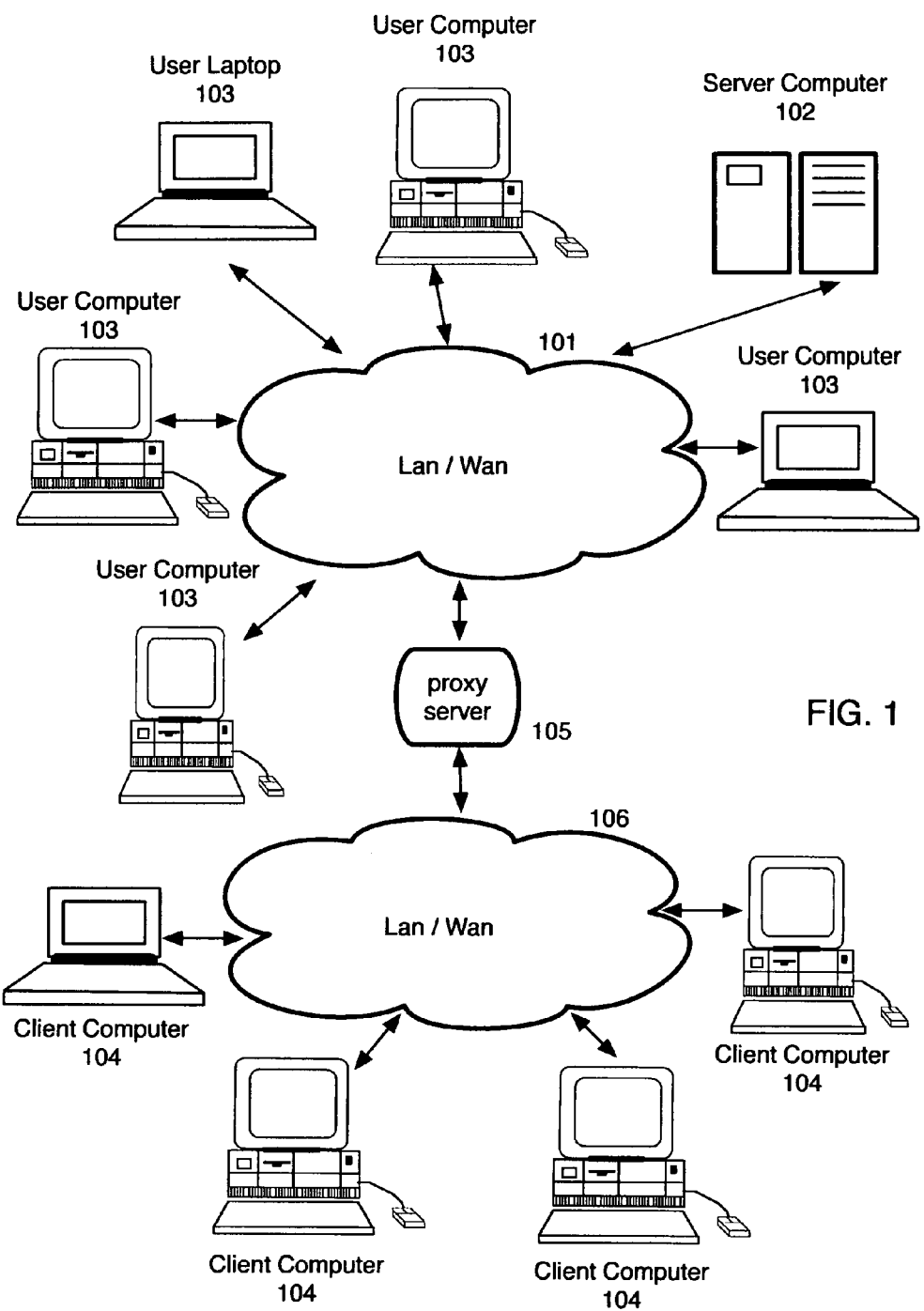
FIG. 1 illustrates a distributed computing system for implementing an embodiment of the present invention.

FIG. 1 illustrates a one possible organization for a distributed computing system for implementing an embodiment of the present invention. The distributed computing system includes a plurality of computing systems connected together using a communications network. These computing systems include user workstations and laptop computers 103 directly connected to a wide area network (WAN) 101. Also connected to the WAN 101 is a plurality of server computers 102. In one possible embodiment of the present invention, the WAN 101 may be the Internet in which user computers 103 connected using a typical dial-up connection through an internet service provider (ISP). Other types of connections that can be used include T1, DSL (digital subscriber line), ISDN (Integrated Services Digital Network) or cable.

Users of the network may also connect to the communications system using client computers 104 that are connected to a local area network (LAN) 106 in which the LAN 106 is connected to the internet 101 through a proxy server. In this arrangement, the client computers access resources located on the internet 101 by sending the request to the proxy server 105. The proxy server 105 in turn forwards the request to a destination on the internet. The response to this request is received by the proxy server 105 which forwards the request to the requesting client computer 104. Other arrangements may also be used, such as a peer to peer architecture.

Server computers 102 receive these service requests from user client computers 103, 104 and generate the appropriate responses. Such requests commonly employ the standard http communications protocol. Other protocols include ftp, pop, smtp and telnet. The responses generated and returned to the user client computers 103, 104 can be in the form of a web page specified in HTML that may be displayed to the user utilizing a browser such as MICROSOFT INTERNET EXPLORER or NETSCAPE NAVIGATOR. Web pages specified in other markup languages such as SGML, VRML, or XML are also contemplated. Depending on the internet protocol used, the service requests will elicit responses other than browser displayed pages, such as file transfer, mail sending, or mail receiving.

The server computers 102 may store "back end" information in formats such as a database, data warehouse, file repository, program repository, document repository, image repository, audio file repository, video file repository, or any other archive of electronic items. These items may also be stored in a distributed manner across one or more server computers 102. A web site can be programmed to access any of these electronic data formats. Client computer 103 programs, such as browsers, allow a remote user to access the information stored on the web site and to navigate around the web. Generally, browsers employ a graphical user interface displayed on monitor 152 which allows the computer 103 to utilize a mouse 146 or other input device perform server 102 and data accession and navigation functions via the graphical interface. Data accession encompasses digital media including text, hypertext, images, graphics, files, programs, documents, audio, animation, streaming data or any other type of digital media.

Figure 1A:
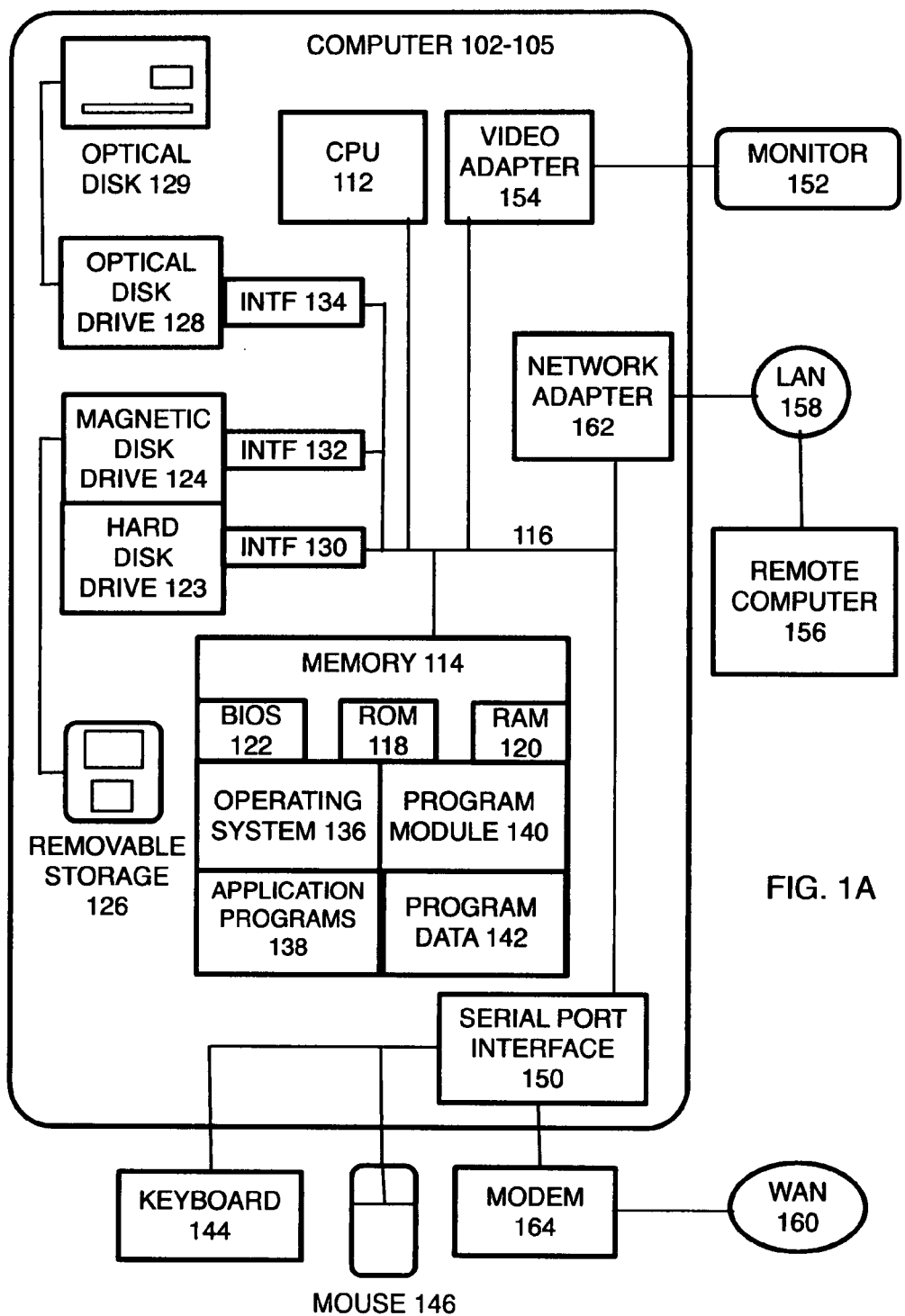
FIG. 1a illustrates computers according to an embodiment of the present invention.

FIG. 1a illustrates an exemplary computing system for an embodiment of the invention. The system includes a general purpose computing device in the form of a conventional computer system 102, 103, 104, or 105 including a processor unit 112, a system memory 114, and a system bus 116 that couples various system components including the system memory 114 to the processor unit 112. The system bus 116 may be any of several types of bus structures including a memory bus or memory controller, a peripheral bus and a local bus using any of a variety of bus architectures. The system memory includes read only memory (ROM) 118 and random access memory (RAM) 120. A basic input/output system 122 (BIOS), which contains basic routines that help transfer information between elements within the computer system 102, 103, 104, or 105, is stored in ROM 118.

The computer system 102, 103, 104, or 105 further includes a hard disk drive 123 for reading from and writing to a hard disk, a magnetic disk drive 124 for reading from or writing to a removable magnetic disk 126, and an optical disk drive 128 for reading from or writing to a removable optical disk 129 such as a CD ROM, DVD, or other optical media. The hard disk drive 123, magnetic disk drive 124, and optical disk drive 128 are connected to the system bus 116 by a hard disk drive interface 130, a magnetic disk drive interface 132, and an optical drive interface 134, respectively. The drives and their associated computer-readable media provide nonvolatile storage of computer readable instructions, data structures, programs, and other data for the computer system 102, 103, 104, or 105.

Although the exemplary environment described herein employs a hard disk, a removable magnetic disk 126, and a removable optical disk 129, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 126, optical disk 129, ROM 118 or RAM 120, including an operating system 136, one or more application programs 138, other program modules 140, and program data 142. A user may enter commands and information into the computer system 102, 103, 104, or 105, through input devices such as a keyboard 144 and mouse 146 or other pointing device. Examples of other input devices may include a microphone, joystick, game pad, satellite dish, and scanner. These and other input devices are often connected to the processing unit 112 through a serial port interface 150 that is coupled to the system bus 116. Nevertheless, these input devices also may be connected by other interfaces, such as a parallel port, game port, or a universal serial bus (USB). A monitor 152 or other type of display device is also connected to the system bus 116 via an interface, such as a video adapter 154. In addition to the monitor 152, computer systems typically include other peripheral output devices (not shown), such as speakers and printers.

The computer system 102, 103, 104, or 105, may operate in a networked environment using logical connections to one or more remote computers, such as a remote computer 156. The remote computer 156 may be a computer system, a server, a router, a network PC, a peer device or other common network node, and typically includes many or all of the elements described above relative to the computer system 102, 103, 104, or 105. The network connections include a local area network (LAN) 158 and a wide area network (WAN) 160. Such networking environments are commonplace in offices, enterprise-wide computer networks, intranets, and the Internet.

When used in a LAN networking environment, the computer system 102, 103, 104, or 105 is connected to the local network 158 through a network interface or adapter 162. When used in a WAN networking environment, the computer system 102, 103, 104, or 105 typically includes a modem 164, network card, or other means for establishing communications over the wide area network 160, such as the Internet. The modem 164, which may be internal or external, is connected to the system bus 116 via the serial port interface 150. In a networked environment, program modules depicted relative to the computer system 102, 103, 104, or 105, or portions thereof, may be stored in the remote memory storage device. It will be appreciated that the network connections shown are exemplary, and other means of establishing a communications link between the computers may be used.

A computing device, such as computer system 102, 103, 104, or 105 typically includes at least some form of computer-readable media. Computer readable media can be any available media that can be accessed by the computer system 102, 103, 104, or 105. By way of example, aid not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer system 102, 103, 104, or 105.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 2:
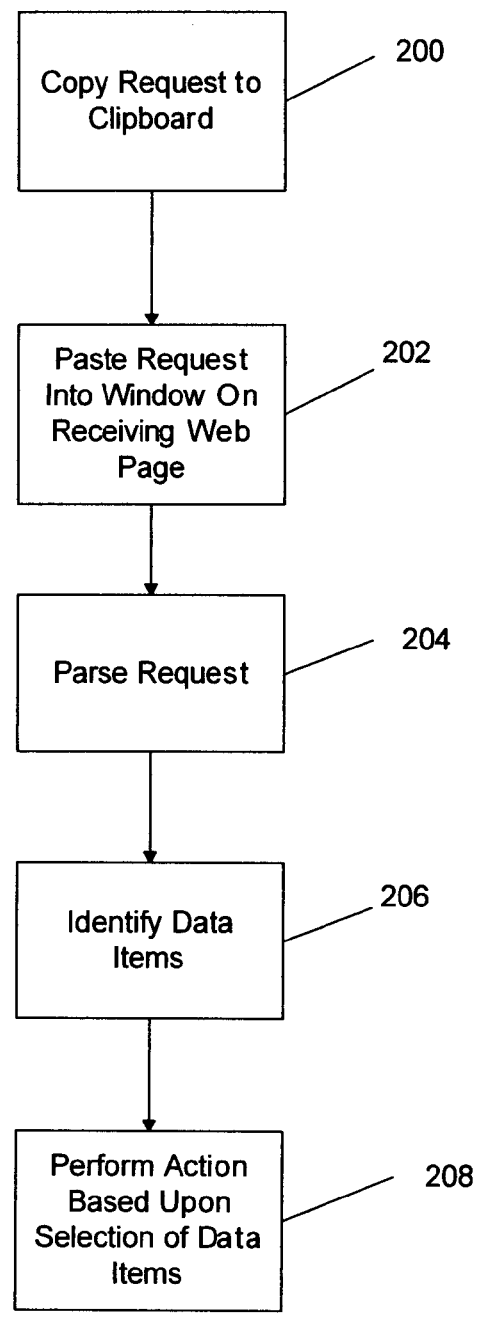
FIG. 2 illustrates the operational flow according to an embodiment of the present invention.

FIG. 2 illustrates the operational flow of one embodiment of a system according to the present invention. Copy operation 200 receives a copy command from a user. Paste operation 202 places the selected information from the copy operation 200 into a window displayed on the web page on monitor 152. Identify items operation 204 parses the request based upon selected criteria. Action operation 206 performs an action in response to identifying the items. Actions may include making the items available for download followed by the user selecting to download the items in a bundled or non-bundled form. Other actions for electronic data items include making a hard copy of the items on CD, DVD, floppy disk, zip disk, magnetic tape, or paper; followed by shipping the items by U.S. mail or other carrier service. For non-electronic items (such as clothing), actions comprise shipping. Action operation 206 may include the steps of requesting more items, asking for and entering credit card information as well as personal information such as name and address or other characteristics. Examples of electronic items include multimedia files, image files, document files, and program files. Specific file types include MP3, MP4, gif, jpeg, pdf, tif, bitmap, dll, exe, and C.

The copy operation 200 and the paste operation 202 are performed through what is commonly known to "copy" and "paste" through use of input devices such as a keyboard 144 and mouse 146 or other device any desired part (or whole) of an electronic text-containing page (for example a word processing page, text-containing web page, or email message) that may be displayed on the monitor 152. As used herein the terms "copy" and "paste" are not limited to word processing, but are used to characterize input commands provided to input devices to accomplish the functions and behaviors of copying and pasting. Copy includes any method of selecting data; paste includes any method of placing data. To copy a paragraph using the mouse 146, the user can highlight the desired text by clicking and dragging the mouse 146 over the desired text, pointing the mouse 146 to a drop-down menu and selecting "copy" from the menu, then pointing the mouse at the desired location for producing the copied text and selecting "paste" from the drop-down menu. The functions provided by the drop-down menu "copy" and "paste" selections can also be accomplished by simple keystrokes such as "control-C" for copy and "control-V" for paste. It may also be desirable to "cut" and "paste" the desired text; whereupon the "cut" menu selection or "control-X" keystroke can be employed. It is also understood that "copied" data is saved to a buffer generally called a clipboard or scrapbook. At the time of the instant invention, the foregoing are the current conventions in copying and pasting and are outlined herein as a functional illustration. However, the invention is not limited to these conventions and contemplates other methods of selecting information. The copy and paste functions could be integrated such that one user input command performs both functions. Other ways of achieving copying and pasting may employ input devices such as voice commands or pointing devices alternative to a mouse 146, such as a light pen, finger to a touch screen, eye focus sensing device, or alternative keystrokes on the keyboard 144.

one embodiment, a method and system is provided that permits a requester of electronic information to enter the request in a streamlined fashion via the client computer 103 (e.g. by "paste") and obtain the desired electronic information from the server computer 102 without having to use excessive keyboard and mouse strokes. The streamlined method typically comprises a "paste" step, wherein an electronic text-containing page is electronically pasted (by mouse or simple keystrokes, or combination thereof) into an appropriate window on a receiving web page displayed on a monitor 152 attached to the client computer 103. The electronic text-containing page may include an email message, a word processing document, an electronic journal article, patent text, search result page, or HTML page. The electronic text-containing page comprises words, letters, numbers and/or symbolic characters. Some of the text in this electronic text-containing page is a reference to a specific item (for example, a patent number, UPN, SKU number, or other unique identifier). Once the electronic text-containing page is pasted into the appropriate window, an executable application, script, or program parses the pasted information and identifies the specific items referred to therein. The logical steps to parse the information are known by those of skill in the art may be written in a variety of programming languages, including perl, java, C, C++, javascript, Tcl/Tk, Python, Fortran, Pascal, Cobol, BASIC, or Visual BASIC. A parsing and identifying program may reside and be executed via one or more of the computers 102, 103, 104, or 105. If the specific items are digital files, they may be delivered to the user's computer 103 electronically. The user needs only to paste a request into an appropriate location on the receiving web page, rather than re-enter the request manually by typing it out on the keyboard. This streamlined method provides a great benefit for requests that contain numerous items to be obtained. One example is the ordering of patents or other publications via a web interface. A United States patent may list several "references cited" on the face of the patent, as well as citing patents within the text of the patent specification. A user may copy any part of or the entire patent, including the front page into an appropriate window on the receiving web page. This streamlined method removes the time consuming and error prone necessity of a human mentally parsing a list (or other text page) containing numerous items and then entering the desired items individually. Time is saved because the user does not have to enter each item individually, and typographical errors are obviated because no typing is required. The user may type out the whole request or paste part of the request and type out additional requests or information in the same window. A variety of formats may be accepted by the computer system 103. The items will be identified and delivered to the computer system 103 as long as the request includes the desired items.

The identify operation 204 may be performed by logical steps encoded by different programming languages. Different languages have different capabilities, strengths, and portabilities. If the identify operation 204 is performed by the server 102, then portability is less of a concern. For example, if a user's request is sent to the server 102 via an HTML form action, a servlet or cgi application can parse and perform other operations on the incoming data stream. A concern is potentially slower performance or reaching a maximum number of users. Performing logical operations on the client side may be more difficult because different browsers interpret instructions in different manners with different end results. An example of this is browser interpretation of Javascript and Java. Furthermore, execution on the client side may pose security issues, the consequence of which affects obtaining information from outside the browser. Generally, applets are interactive, contained applications that do not necessarily communicate user entered data to the server. The latter can be accomplished, however, by opening an I/O data stream to the server. Typically, applets are not permitted to access the client file system, and until recently, could not accept information from the client clipboard. The instant invention encompasses embodiments where the parsing operation is performed on the server as a server application, servlet, or cgi application. Alternatively, the instant application encompasses performing the parsing operation on the client side and transferring the results to the server. Other configurations and methods of execution are known to those skilled in the art.

In another embodiment, the copy and paste operation may be performed through a single user input command. In yet another embodiment, the paste operation 202 identifies the information for the server computer system 102 without displaying the information on the computer system 103. The information may then be transferred from the client computer 103 to the server computer 102 for processing without displaying the selected information on the client computer 103.

Figure 3:
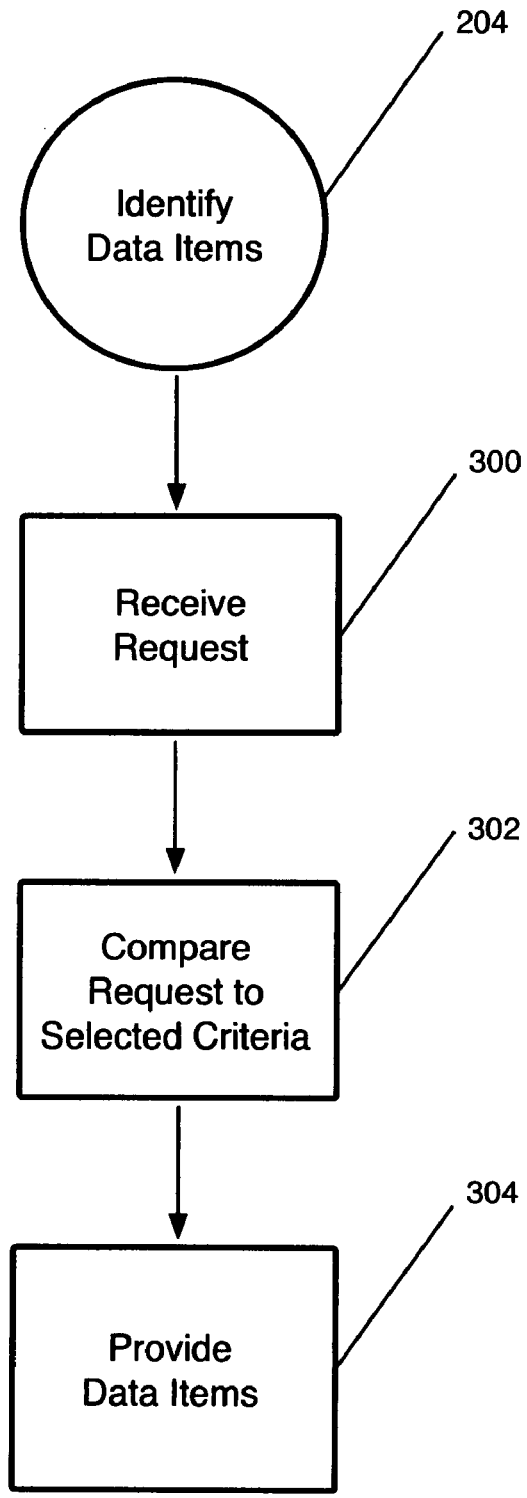
FIG. 3 illustrates the operational flow of one embodiment of the identify operation according to the present invention.
Figure 5:
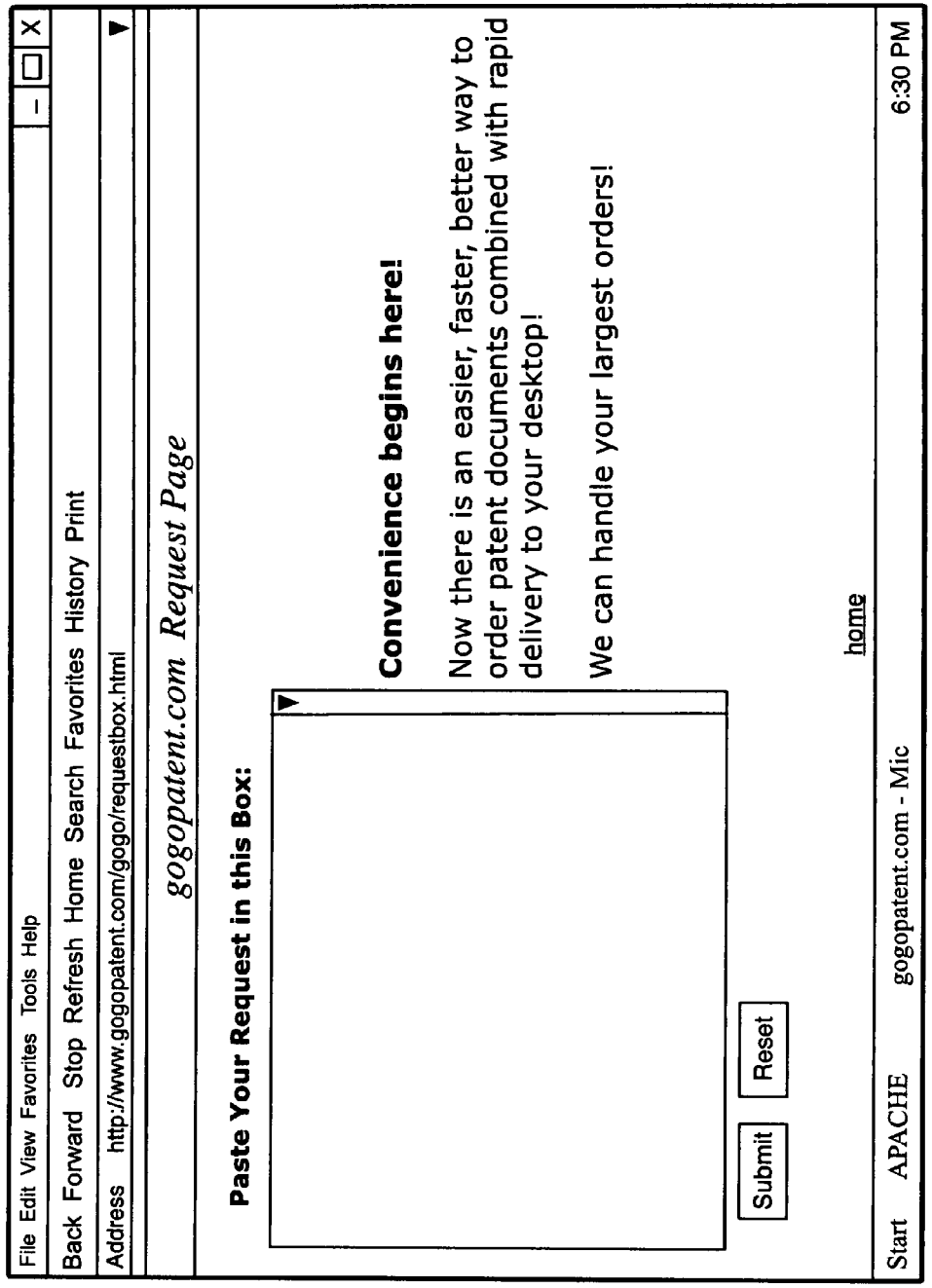
FIG. 5 is an exemplary screen display showing an input window.

FIG. 3 illustrates the operational flow of one embodiment of the identify operation 204 according to the present invention wherein logical operations are performed by the server computer 102. Block 300 represents the server computer system 102 receiving the request. Block 302 represents the server computer system 102 comparing the request to selected criteria. Block 304 represents the server computer 102 providing items based upon comparing the request to selected criteria. Identify operation 204 identifies the requested items from the request.

In one embodiment where the request includes text with items referenced by unique identifiers, the text is treated as a string and is parsed based upon selected criteria that recognize the format of the unique identifier(s). The text string may be modified to remove whitespace and/or URL encoding and/or symbolic characters or other characters if this is desirable. Modification of the input string may become desirable if whitespace, URL encoding, symbolic characters, etc. affect the ability of the selected criteria to be recognized. For example, a patent document contains various numbers including dates, classification information, patent numbers, and possibly other numbers. Matching the selected criteria used to identify patent numbers from among the other numbers and text may depend upon, for example, removing all commas, or deleting (or ignoring) numbers with an intervening slash. The selected criteria may be numerous and include many matching operations. For example, the selected criteria may be a series of patterns to be matched alternatively. If a series of patterns are to be matched, the optional string modifying steps should not interfere with the ability to match and therefore identify one pattern over another. The pattern to be matched during the identify operation(s) may include wildcards if appropriate. Also, if necessary, some string patterns may be modified by the executable by additions, such as zero-filling of numbers, after a basic pattern is matched. The parse operation can be thought of as a selective search engine that seeks pattern matches to unique identifiers of items. Those skilled in the art will recognize that accomplishing pattern matching may be different for each programming language.

One embodiment of the present invention is especially suited for rapid identification and electronic delivery of electronically archivable items such as document files, image files, digital music files, multimedia files, video files, animation files, and program files. These items can be downloaded directly from server computers 102 to the client computers 103 and 104 in response to appropriate requests. Other items not electronically archivable such as books, clothing, groceries, flowers, and articles of manufacture can also be ordered in this fashion, although the actual product must be separately shipped or delivered.

FIGS. 4-8 illustrate ordering an electronic data file representing a patent or other document according to one embodiment of the present invention. FIG. 4 illustrates an exemplary screen display showing the text of an email message displayed on screen of the monitor 152. The email message contains text describing various patents in narrative form. A web server 102 provides the client computer 103 with an HTML "form" in a window to input a request from the user, as illustrated in the screen display shown in FIG. 5. In one embodiment, the items requested are electronic files of patent documents in Adobe® Acrobat® pdf format, for example. The user uses a copy and paste operation to copy the contents of the email shown in FIG. 4 to the input window shown in FIG. 5. FIG. 6 is an exemplary screen display showing the text pasted into the input window shown in FIG. 5. The server computer 102 passes the user's form input to an executable over a common gateway interface (cgi). The executable then sends back to the server computer 102 the results of the identify operation 204 for display to the user. FIG. 7 is an exemplary screen display showing the identified items. The user has the option of modifying the order, canceling the order, or processing the order as is. Further processing of the order, again by sending form data, results in giving the user the delivery option of viewing the electronic files or downloading same files. FIG. 8 is an exemplary screen display showing the files that may be views or downloaded. Servlets can also be employed to execute the parsing/identifying operation(s). The executable on the server computer 102 can be written in a variety of languages. As an alternative to cgi programs and servlets; applets, ActiveX controls, or HTML-embedded scripting can be employed if client side execution is preferred. Those skilled in the art will recognize that many variations of the environment may be employed, wherein the best results may be achieved based upon what one considers to be the most important needs to be fulfilled, and may be a combination of simplicity, speed, security, capability of the programming language, and leveraging existing infrastructure.

In another embodiment, the user may select images displayed on the monitor 152 of the client computer 103. The identify operation 204 may then compare the selected image to a plurality of images stored in a database. These images may be representative of consumer products to be ordered. Known techniques for parsing or matching images may be employed. Exemplary methods and systems for image matching are disclosed in U.S. Pat. Nos. 6,088,483, 6,026,411, 5,933,546, and 5,361,204, which are hereby incorporated by reference. The matching operation which is part of the parsing operation is not limited to ASCII text. The matching operation can include matching of image patterns such as are found in the Japanese language, or other languages with "non-western" characters. Furthermore, the image pattern matching is not limited to black and white, such as text is usually found, but can include colored images such as is found in colored gif or jpeg images.

Figure 9:
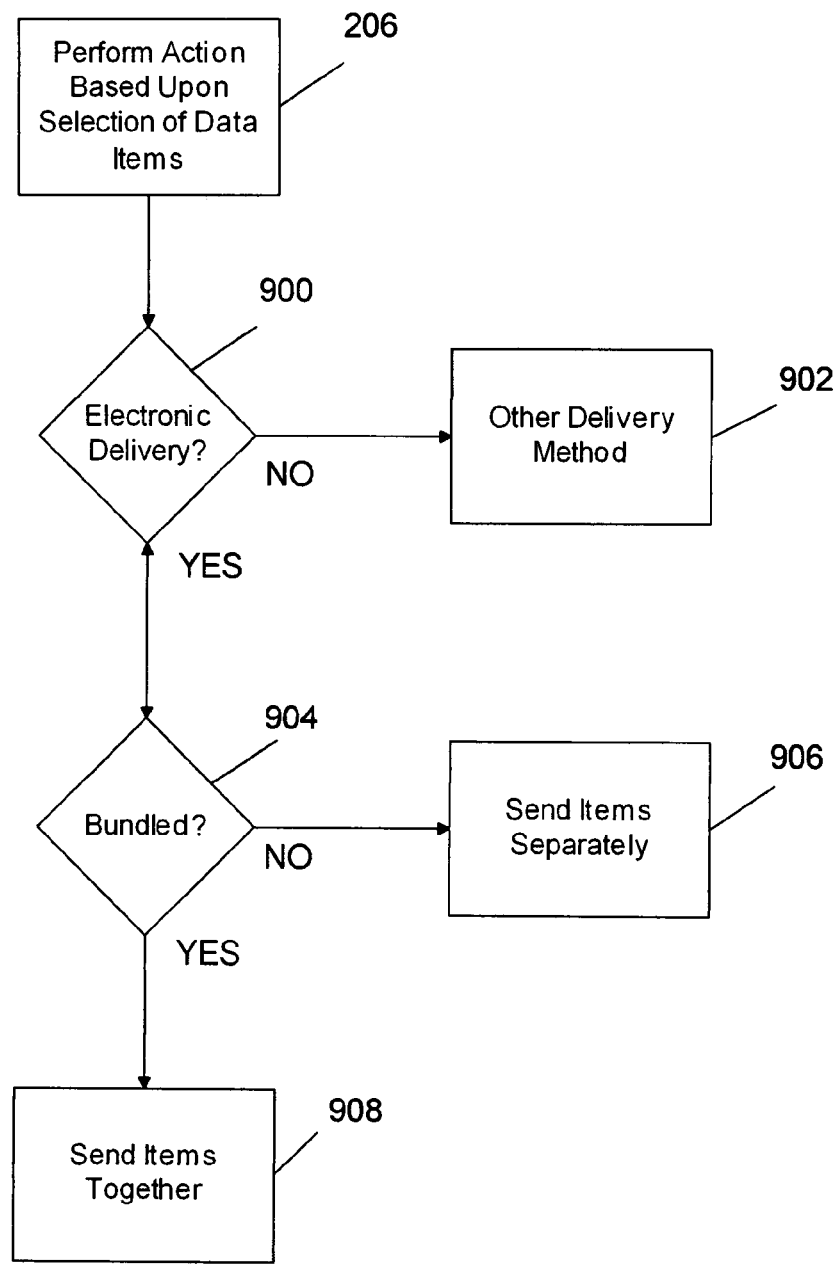
FIG. 9 illustrates the operational flow of one embodiment of a system according to the present invention for the delivery of items that are digitally archivable.

FIG. 9 illustrates the operational flow of one embodiment of a system according to the present invention for the delivery of items that are digitally archivable. Each desired item is represented by a unique identifier. This unique identifier can be numeric, alphabetic, can contain other symbolic keyboard characters, and/or any combination thereof. The program code executing the identify operation 204 recognizes these unique identifiers. Furthermore, the identify operation 204 recognizes these unique identifiers when they are embedded in or surrounded by other keyboard characters. The identify operation 204 parses a string or strings which contain reference to a desired item. Action operation 206 orders these items for delivery. Furthermore, the format of the string or strings containing the unique identifiers is not critical to the recognition of the unique identifiers. A feature of the identify operation 204 is to remove the requirement for special formatting of string input. This feature makes placing orders faster and easier for the requester.

Once the identify operation 204 has parsed the text string and detected the items requested, delivery of the items can occur in several ways as illustrated in FIG. 9. A test operation 900 detects whether the user selects electronic delivery. If not, items may be sent by fax, U.S. mail, FEDEX, or other delivery service as represented by other delivery method operation 902. Furthermore, the medium on which the digitally archivable items are delivered may include CD, DVD, microfilm, magnetic tape, removable disk, zip disk, or paper.

If the user desires electronic delivery, items can be downloaded, sent by email, or retained on a server computer 102 for download at a future time. A test operation 904 detects whether the user wants each item to be sent/downloaded separately as shown by operation 906 or bundled together and sent/downloaded as a single unit as shown by operation 908. Typically, the hardware/software of the client computer 103 will dictate what is the best or most desirable delivery method. If the client computer 103 has a fast connection to the server computer 102, the bundling operation 908 is the most streamlined method of delivery. A client computer 103 may nonetheless select individual delivery regardless of the characteristics of the client computer 103.

For example, a requester wants to receive electronic copies of all the patents cited in the text of a specific patent. The cited patents are the specific items. The requestor could select the text of the entire patent, pass this string to the executable program code of this invention, and run the executable. The executable recognizes all patent numbers and then provides an option to the requestor of how the patent documents (specific items) should be sent. The most streamlined delivery method would be to choose bundled electronic delivery by download.

Another example would encompass ordering digital music files such as MP3 files. The requestor submits a request containing unique identifiers of desired MP3 files to the executable program code. Again, the format of the request is not critical. The request could be the text of an email message or a search result list or any text containing page that also has the unique identifiers for the desired items. If the requestor submits a search result page to the executable of the invention, the text might contain, in addition to the unique identifiers, artist names, biographies, user reviews, etc. The executable detects the unique identifiers of the MP3 files from among all the submitted text. Once the executable code has identified the desired MP3 files, the user can choose a delivery method. Again, depending on the requestor's resources or desires, the requestor may select bundled electronic delivery, wherein all MP3 files ordered are sent/downloaded as a unit; or non-bundled electronic delivery where each MP3 files is sent/downloaded separately. Alternatively, the requestor can select a hard copy on CD, DVD, cassette tape or other appropriate medium for non-electronic delivery.

The logical operations according to the present invention may be implemented through a variety of configurations as is known to those of skill in the art. The logical operations may be performed by executable code executed by remote server computers 102, the same server computer 102 that stores the electronic files, or on another computer 104 or 103 accessible via the LAN 158, WAN 160, or Internet. Alternatively, the logical operations may be embedded in an HTML page (like javascript) or other browser displayed markup language that may executed by the client computer 103. The executable software code for performing the logical operations can be a java applet or activeX control. The executable program code may be a plug-in that is executed by the client computer 103. The logical operations may be implemented via executable program code written in any language that is appropriate for the desired placement of the executable. For example, at the present time, not all programming languages can be embedded in web pages. One skilled in the art understands the requirements for different languages in terms of how and where programs written in a particular language are interpreted; or not interpreted as in compiled code. It is also understood that files can be transferred via any appropriate protocol, including but not limited to TCP/IP protocols such as HTTP and FTP.

Figure 10:
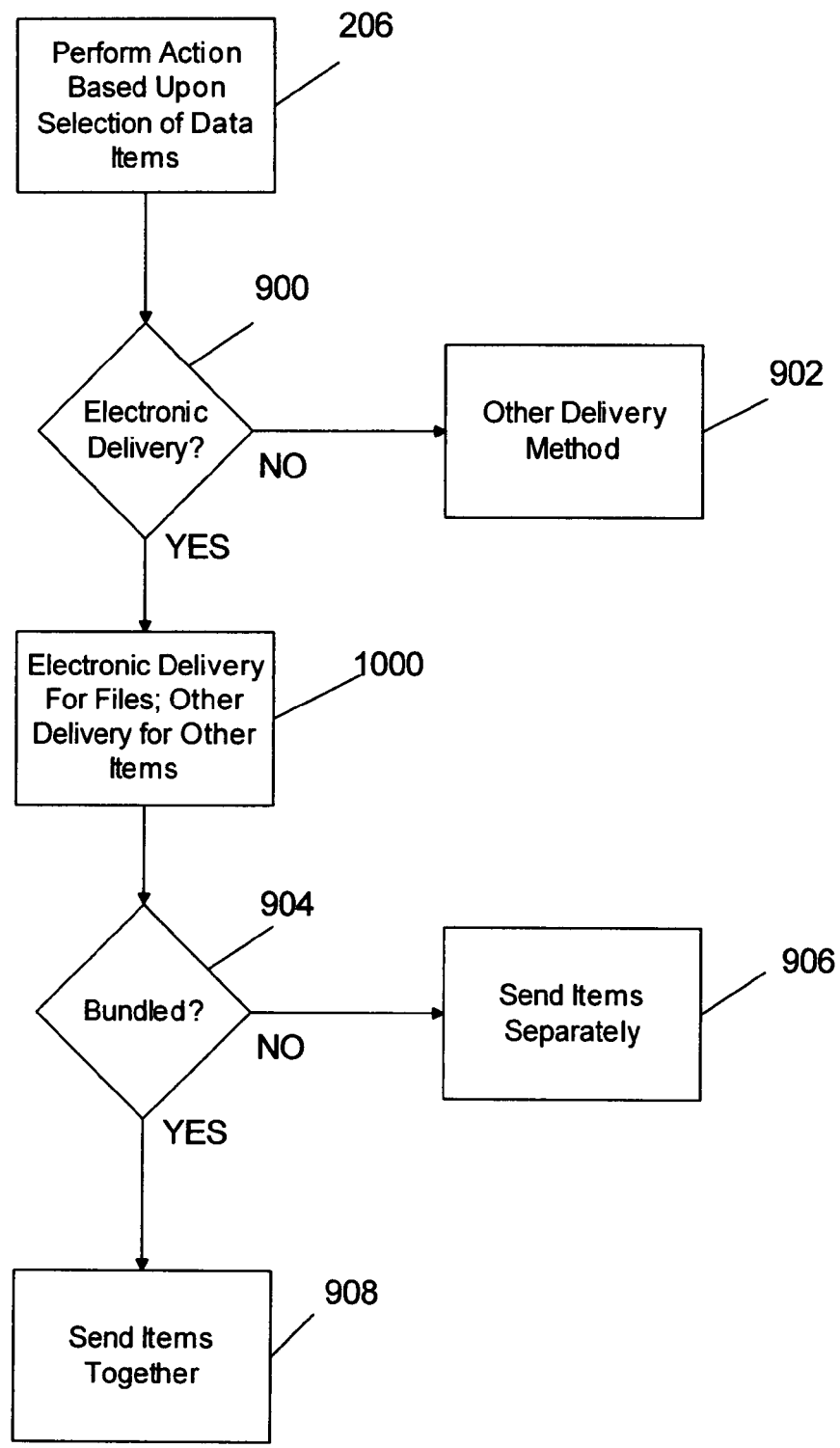
FIG. 10 illustrates the operational flow of one embodiment of a system according to the present invention for the delivery of items in an e-commerce system.

FIG. 10 illustrates the operational flow of one embodiment of a system according to the present invention for the delivery of items in an e-commerce system, wherein electronically archivable items are sold together with non-electronically archivable items. An example commerce system may include the sale of digitally archived movies, music, or exclusive still photos or images in conjunction with t-shirts, souvenirs, and other promotional items. A test operation 900 detects whether the user selects electronic delivery. If not, items may be sent by fax, U.S. mail, FEDEX, or other delivery service as represented by other delivery method operation 902. Furthermore, the medium on which the digitally archivable items are delivered may include CD, DVD, microfilm, magnetic tape, removable disk, zip disk, or paper. If the user desires electronic delivery, electronically archivable items can be downloaded, sent by email, or retained on a server computer 102 for download at a future time. The user may have the option of selecting one or more of several promotional items (for purchase or give-away) in addition to ordering the electronic files. The promotional items may be delivered by the United States Postal Service, for example, while the electronic files, such as MP3, may be downloaded electronically, as represented by operation 1000. Selection of non-digital items may be similar to a shopping cart type of electronic shopping method where the user first browses and then selects items as is known in the art. Other e-commerce systems may be employed. Exemplary e-commerce systems are disclosed in U.S. Pat. Nos. 5,897,622, 5,960,411, 5,745,681, and 5,710,887, which are hereby incorporated by reference.

A test operation 904 detects whether the user wants each item to be sent/downloaded separately as shown by operation 906 or bundled together and sent/downloaded as a single unit as shown by operation 908. Typically, the hardware/software of the client computer 103 will dictate what is the best or most desirable delivery method. If the client computer 103 has a fast connection to the server computer 102, the bundling operation 908 is the most streamlined method of delivery. A client computer 103 may nonetheless select individual delivery regardless of the characteristics of the client computer 103.

In another embodiment, items may be ordered that are not electronically archivable. A request provided by the client computer 103 may include SKU numbers or other non-image or image merchandise or consumer product or service identifiers. The request may contain text or images in addition to the merchandise identifiers. The request is then passed to the identify operation 204 (for example by pasting into a window; or by clicking on an appropriate location on a web page, such as a button) whereupon the identify operation 204 identifies the SKU numbers or other unique identifiers. Action operation 206 will initiate steps to provide the user with the desired products or services in a default manner or a manner selected by the user, as is known in the art. These embodiments will allow for the efficient ordering of merchandise or services from retailers.

The logical operations according to the present invention may also include payment operations, (e.g., by account number or credit card), order deletion operations, or order cancellation operations, as is known to those skilled in the art of e-commerce applications.

One embodiment of the present invention encompasses file delivery methods and systems that do not require a database search. Another embodiment may be used in conjunction with a database. Another embodiment may also be used in applications not involving databases of stored information records. An example of a non-database application would include a user who already knows which files are desired and therefore does not need to perform a database search. The query operation is optional.

An embodiment of the present invention further provides for the dynamic bundling or wrapping of ordered files such that they are sent to the user as a single unit, rather than the user having to open or click on each file individually to view or download it. Bundled files may include multimedia files such as digital music files, video files, image and document files. Typically, internet download speeds deter the electronic transfer of multiple large files simultaneously. However, embodiments of the invention described herein provide a streamlined ordering process that facilitate large file transfers.

Thus, the present invention is presently embodied as a method, apparatus, computer program product or computer readable media encoding a computer program for requesting information from a server computer.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for retrieving a plurality of electronic files over a wide area network, the method comprising:

provideing a browser window comprising a web page executed on a computer, wherein the web page comprises a form, wherein the form is capable of receiving a text request string from an electronic mail message;

receiving in said form a text request string comprising unique identifiers and unformatted text, wherein the unique identifiers uniquely identify electronic files;

parsing the text request string to identify the unique identifiers in the string, wherein identifying includes matching based on selected criteria;

providing the unique identifiers to a user for selection of a plurality of said unique identifiers, wherein the number of unique identifiers provided to the user for selection is the same as the number of electronic files for retrieval;

querying a user to order the electronic files identified by the selected unique identifiers, wherein a plurality of electronic files ordered are delivered to a user electronically.

2. The method of claim 1, wherein files identified by the selected unique identifiers are delivered electronically as a bundle.

3. The method of claim 1, wherein the file is selected from multimedia files, image files, document files, and program files.

4. The method of claim 1, wherein the parsing step is executed by a client computer.

5. The method of claim 1, wherein the parsing step is executed by a server computer.

6. A computer-implemented method for retrieving a plurality of items over a wide area network, the method comprising:

providing a browser window comprising a web page executed on a computer, wherein the web page comprises a form, wherein the form is capable of receiving a request from an electronic mail message;

receiving in said form a request comprising unique identifiers and data, wherein the unique identifiers identify unique items;

parsing the request to identify the unique identifiers, wherein identifying includes matching based on selected criteria;

providing the unique identifiers to a user for selection of a plurality of said unique identifiers, wherein the number of unique identifiers provided to the user for selection is the same as the number of items for retrieval;

querying a user to order the items identified by the selected unique identifiers, wherein a plurality of items ordered are delivered to a user electronically.

7. The method of claim 6, wherein the items are files selected from multimedia files, image files, document files, and program files.

8. The method of claim 6, wherein items identified by the selected unique identifiers are delivered electronically as a bundle.

9. The method of claim 6, wherein the parsing step is executed by a client computer.

10. The method of claim 6, wherein the parsing step is executed by a server computer.

11. The method of claim 6, wherein the request comprises text.

12. The method of claim 6, wherein the request comprises an image.

13. A computer-implemented system for retrieving a plurality of items over a wide area network comprising:

a browser window comprising a web page executed on a computer, wherein the web page comprises a form, wherein the form is capable of receiving a request from an electronic mail message;

a request module receiving a request comprising unique identifiers and data wherein the unique identifiers identify unique items;

a parser module identifying the unique identifiers, wherein identifying includes matching based on selected criteria;

a display module that provides the unique identifiers to a user for selection of one or more a plurality of the unique identifiers; wherein the number of unique identifiers provided to the user for selection is the same as the number of items for retrieval;

an order module that enables a server system to process an order for the a plurality of items identified by the unique identifiers; wherein a plurality of items ordered are delivered to a user electronically.

14. The method of claim 13, wherein the items are files selected from multimedia files, image files, document files, and program files.

15. The method of claim 13, wherein items identified by the selected unique identifiers are delivered electronically as a bundle.

16. The system of claim 13, wherein the parser module is implemented on a server computer.

17. The system of claim 13, wherein the parser module is implemented on a client computer.

18. The method of claim 13, wherein the request comprises an image.

* * * * *